United States Patent
Zhang et al.

(10) Patent No.: US 11,822,034 B2
(45) Date of Patent: Nov. 21, 2023

(54) METHOD FOR CALIBRATING SENSOR IN VENDING MACHINE AND VENDING MACHINE

(71) Applicants: WEIHAI NEW BEIYANG DIGITAL TECHNOLOGY CO., LTD., Shandong (CN); SHANDONG NEW BEIYANG INFORMATION TECHNOLOGY CO., LTD., Shandong (CN)

(72) Inventors: Chunguang Zhang, Shandong (CN); Zhiming Li, Shandong (CN); Xiaohua Huang, Shandong (CN); Tianxin Jiang, Shandong (CN); Chuntao Wang, Shandong (CN)

(73) Assignees: WEIHAI NEW BEIYANG DIGITAL TECHNOLOGY CO., LTD.; SHANDONG NEW BEIYANG INFORMATION TECHNOLOGY CO., LTD.

( * ) Notice: Subject to any disclaimer, the term of this patent is extended or adjusted under 35 U.S.C. 154(b) by 203 days.

(21) Appl. No.: 17/607,159

(22) PCT Filed: Apr. 29, 2020

(86) PCT No.: PCT/CN2020/087747
§ 371 (c)(1),
(2) Date: May 19, 2022

(87) PCT Pub. No.: WO2020/221288
PCT Pub. Date: Nov. 5, 2020

(65) Prior Publication Data
US 2022/0276407 A1   Sep. 1, 2022

(30) Foreign Application Priority Data
Apr. 29, 2019 (CN) .......................... 201910356529.X

(51) Int. Cl.
*G01V 8/20* (2006.01)
*G01V 13/00* (2006.01)
*G07F 11/00* (2006.01)

(52) U.S. Cl.
CPC ................ *G01V 13/00* (2013.01); *G01V 8/20* (2013.01); *G07F 11/00* (2013.01)

(58) Field of Classification Search
CPC . G01V 8/12; G01V 8/20; G01V 13/00; G07F 11/00
See application file for complete search history.

(56) References Cited

U.S. PATENT DOCUMENTS

| | | | |
|---|---|---|---|
| 2007/0213871 A1* | 9/2007 | Whitten | G07F 9/026 250/223 R |
| 2017/0069157 A1* | 3/2017 | Sternowski | G01P 13/04 |
| 2017/0172315 A1 | 6/2017 | Hay | |

FOREIGN PATENT DOCUMENTS

| | | |
|---|---|---|
| CN | 101548283 A | 9/2009 |
| CN | 105741413 A | 7/2016 |

(Continued)

OTHER PUBLICATIONS

English Translation of International Search Report dated Jul. 29, 2020; International Patent Application No. PCT/CN2020/087747 filed on Apr. 29, 2020.

*Primary Examiner* — Kevin K Pyo
(74) *Attorney, Agent, or Firm* — McDonald Hopkins LLC

(57) ABSTRACT

Provided are a method for calibrating sensors in a vending machine and a vending machine. input values of first input terminals and input values of second input terminals of sensors are determined through level 1 calibration and level 2 calibration, respectively, which may greatly increase the number of adjustable grades of the luminous intensity of an (Continued)

optical generator of each sensor, and may further greatly improve the success rate of calibration on the sensors.

10 Claims, 4 Drawing Sheets

(56) References Cited

FOREIGN PATENT DOCUMENTS

| | | |
|---|---|---|
| CN | 106846616 A | 6/2017 |
| CN | 108496147 A | 9/2018 |

* cited by examiner

Take any one of a plurality of storage columns as a target storage column, set input values of first input terminals of all sensors in the target storage column to a preset reference value, and perform level 1 calibration on second input terminals of all the sensors in the target storage column to determine a first target input value common to the second input terminals of all the sensors in the target storage column, wherein output values of all the sensors in the target storage column meet the requirements for level 1 calibration in case that the input values of the first input terminals of all the sensors in the target storage column are set to the preset reference value and the input values of the second input terminals of all the sensors in the target storage column are set to the first target input value common to the second input terminals

S210

Set the input values of the second input terminals of all the sensors in the target storage column to the first target input value common to the second input terminals, and perform level 2 calibration on the first input terminal of each sensor in the target storage column to determine a second target input value corresponding to the first input terminal of the sensor, wherein the output values of all the sensors in the target storage column meet the requirements for level 2 calibration in case that the input values of the second input terminals of all the sensors in the target storage column are set to the first target input value common to the second input terminals and the input value of the first input terminal of each sensor in the target storage column is set to the second target input value corresponding to the sensor

S220

Set the input value of the first input terminal of each sensor in the target storage column to the second target input value corresponding to the sensor

METHOD FOR CALIBRATING SENSOR IN VENDING MACHINE AND VENDING MACHINE

This application is a 35 U.S.C. 371 national stage filing of PCT Application No. PCT/CN2020/087747 filed on Apr. 29, 2020, which claims the priority of Chinese Patent Application No. 201910356529.X filed with the CNIPA on Apr. 29, 2019, the disclosures of each of which are incorporated herein by reference in their entireties.

TECHNICAL FIELD

The present disclosure relates to the technical field of vending, for example, to a method for calibrating sensors in a vending machine and a vending machine.

BACKGROUND

A vending machine is disclosed in the related art, including a plurality of storage columns configured to store items. Each storage column includes a base plate, a first baffle, and a second baffle, where the base plate, the first baffle and the second baffle all extend along the length thereof in a layout direction of items, and the first baffle and the second baffle are spaced on the base plate face to face. Each storage column further includes a plurality of photoelectric sensors spaced in the layout direction of items, and each sensor includes an optical generator and an optical receiver, which are disposed face to face. Either the optical generator or the optical receiver is disposed on one side of the first baffle close to the second baffle, and the other is disposed on one side of the second baffle close to the first baffle. The vending machine further includes a controller, which controls the optical generator of the sensor in each storage column to give out light, takes output values of the optical receiver of the sensor, and compares the output value of the optical receiver with a preset threshold to determine whether there is any item at a detection position of the sensor.

The vending machine in the related art detects items in the storage column with the photoelectric sensors. Based on the characteristics of photoelectric sensors, users need to calibrate the sensors of the vending machine in the related technologies in some cases, such as before delivery of the vending machine, or the sensors getting aged after a long-term use of the vending machine, or a change in the light transmittance of items stored in the vending machine. In the related technologies, a method for calibrating the photoelectric sensor is usually to adjust the luminous intensity of the optical generator of the sensor under predetermined conditions (such as putting a predetermined item between the optical generator and the optical receiver of the sensor), so that the output value of the optical receiver of the sensor is a preset target value under the predetermined conditions.

However, the vending machine in the related technologies includes a plurality of storage columns each provided with a plurality of sensors, therefore there will be a large number (such as thousands or even tens of thousands) of sensors disposed in the vending machine, which will cause the sensors to be distributed more discretely. Moreover, since the width of the storage columns of the vending machine often needs to adapt to the size of items, the plurality of storage columns of the vending machine may be of different widths if the vending machine sells a variety of items, and the output value of the optical receiver of the sensor will also be affected by the width of the storage columns when the optical generator of the sensor has a fixed luminous intensity, thus causing the sensors in the vending machine to be distributed more discretely.

It is found herein that a failure tends to occur in the process of calibrating a plurality of sensors in the vending machine when the vending machine includes a large number of sensors discretely distributed.

SUMMARY

A method for calibrating sensors in a vending machine and a vending machine are disclosed in the present disclosure to avoid a failure that tends to occur in the process of calibrating a plurality of sensors in the vending machine when the vending machine includes a large number of sensors discretely distributed.

In a first aspect, a method for calibrating sensors in a vending machine is disclosed according to an embodiment of the present disclosure, the vending machine includes at least one storage column in which a plurality of sensors are provided, where each sensor includes a first input terminal and a second input terminal which are both configured to receive an input value to adjust an output value of the sensor; the method for calibrating sensors in a vending machine includes following steps of:

taking any one of the plurality of storage columns as a target storage column, setting the input values of the first input terminals of all sensors in the target storage column to a preset reference value, and performing level 1 calibration on the second input terminals of all the sensors in the target storage column to determine a first target input value which is common to the second input terminals of all the sensors in the target storage column, where the output values of all the sensors in the target storage column meet the requirements for the level 1 calibration in a case where the input values of the first input terminals of all the sensors in the target storage column are set to the preset reference value and the input values of the second input terminals of all the sensors in the target storage column are set to the first target input value which is common to the second input terminals;

setting the input values of the second input terminals of all the sensors in the target storage column to the first target input value which is common to the second input terminals, and performing level 2 calibration on the first input terminal of each sensor in the target storage column to determine a second target input value corresponding to the first input terminal of the sensor, where the output values of all the sensors in the target storage column meet the requirements for the level 2 calibration in a case where the input values of the second input terminals of all the sensors in the target storage column are set to the first target input value which is common to the second input terminals and the input value of the first input terminal of each sensor in the target storage column is set to the second target input value corresponding to the sensor; and setting the input value of the first input terminal of each sensor in the target storage column to the second target input value corresponding to the sensor.

In a second aspect, a vending machine is further disclosed according to an embodiment of the present disclosure, including a controller and at least one storage column, where a plurality of sensors electrically connected to the controller are provided in each storage column, each sensor includes a first input terminal and a second input terminal which are both configured to receive an input value to adjust an output value of the sensor, and the controller is configured to:

take any one of the plurality of storage columns as a target storage column, set the input values of the first input terminals of all the sensors in the target storage column to a preset reference value, and perform level 1 calibration on the second input terminals of all the sensors in the target storage column to determine a first target input value which is common to the second input terminals of all the sensors in the target storage column, where the output values of all the sensors in the target storage column meet the requirements for the level 1 calibration in a case where the input values of the first input terminals of all the sensors in the target storage column are set to the preset reference value and the input values of the second input terminals of all the sensors in the target storage column are set to the first target input value which is common to the second input terminals; set the input values of the second input terminals of all the sensors in the target storage column to the first target input value which is common to the second input terminals, and perform level 2 calibration on the first input terminal of each sensor in the target storage column to determine a second target input value corresponding to the first input terminal of the sensor, where the output values of all the sensors in the target storage column meet the requirements for the level 2 calibration in a case where the input values of the second input terminals of all the sensors in the target storage column are set to the first target input value which is common to the second input terminals and the input value of the first input terminal of each sensor in the target storage column is set to the second target input value corresponding to the sensor; and set the input value of the first input terminal of each sensor in the target storage column to the second target input value corresponding to the sensor.

BRIEF DESCRIPTION OF DRAWINGS

FIG. 6 is a flowchart of a method for calibrating sensors in a vending machine according to an embodiment of the present disclosure, in which: 100—vending machine; 110—cabinet body; 111—opening; 120—cabinet door; 130—storage column; 131—base plate; 132—first baffle; 133—second baffle; 140—photoelectric sensor; 141—optical generator; 141*a*—first input terminal; 141*b*—second input terminal; 142—optical receiver; 150—controller; 160—memory; and 170—prompter.

DETAILED DESCRIPTION

Figure 1:
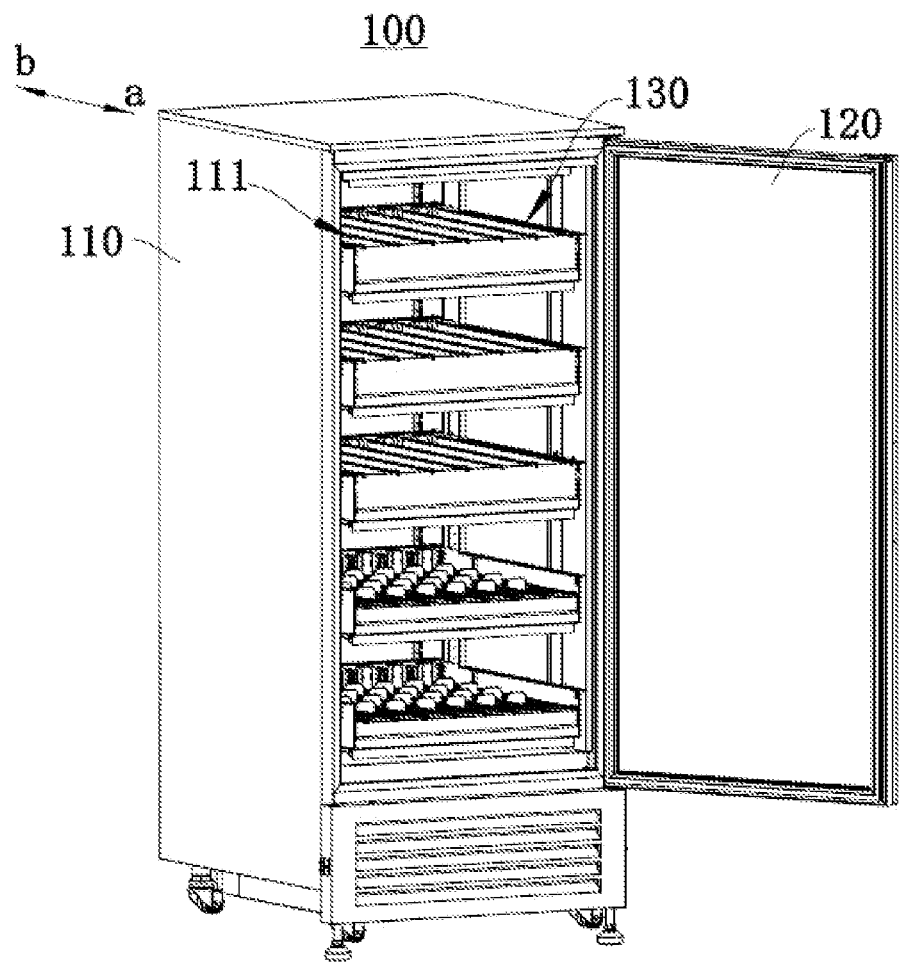
FIG. 1 is a schematic diagram illustrating the structure of a vending machine according to an embodiment of the present disclosure.

It should be noted that similar reference numerals and letters indicate similar items in the drawings below. Therefore, once defined in one drawing, an item does not need to be defined and interpreted in subsequent drawings.

In the description of embodiments of the present disclosure, it should be noted that the terms such as "first" and "second" cannot be construed as indicating or implying relative importance but are merely used for describing distinctively.

Further, it should be noted in the description of the embodiments of the present disclosure that the terms "setting", "installation" and "connection" shall be construed broadly unless otherwise expressly specified and defined. For example, the connection may be a fixed connection, removable connection, integrated connection, direct connection, indirect connection through intermediate components, or connection between two components. Those of ordinary skill in the art will understand the specific meanings of the above terms in the embodiments of the present disclosure on a case-by-case basis.

Figure 2:
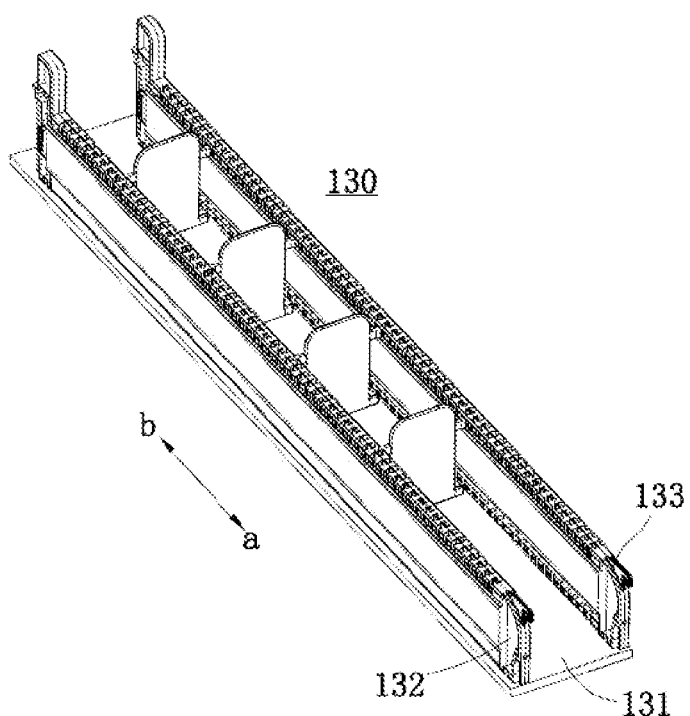
FIG. 2 is a schematic diagram illustrating the structure of a storage column of the vending machine viewed from a first angle according to the embodiment of the present disclosure.
Figure 3:
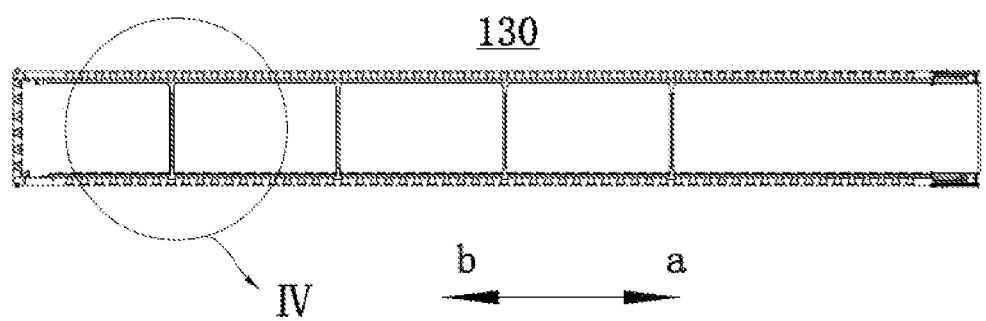
FIG. 3 is a schematic diagram illustrating the structure of the storage column of the vending machine viewed from a second angle according to the embodiment of the present disclosure.
Figure 4:
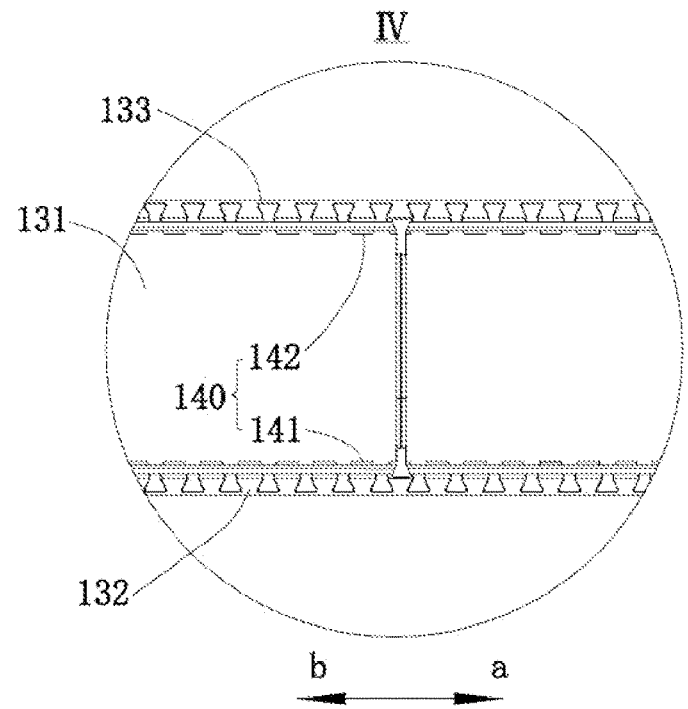
FIG. 4 is an enlarged view of a local structure of the storage column of the vending machine according to the embodiment of the present disclosure.
Figure 5:
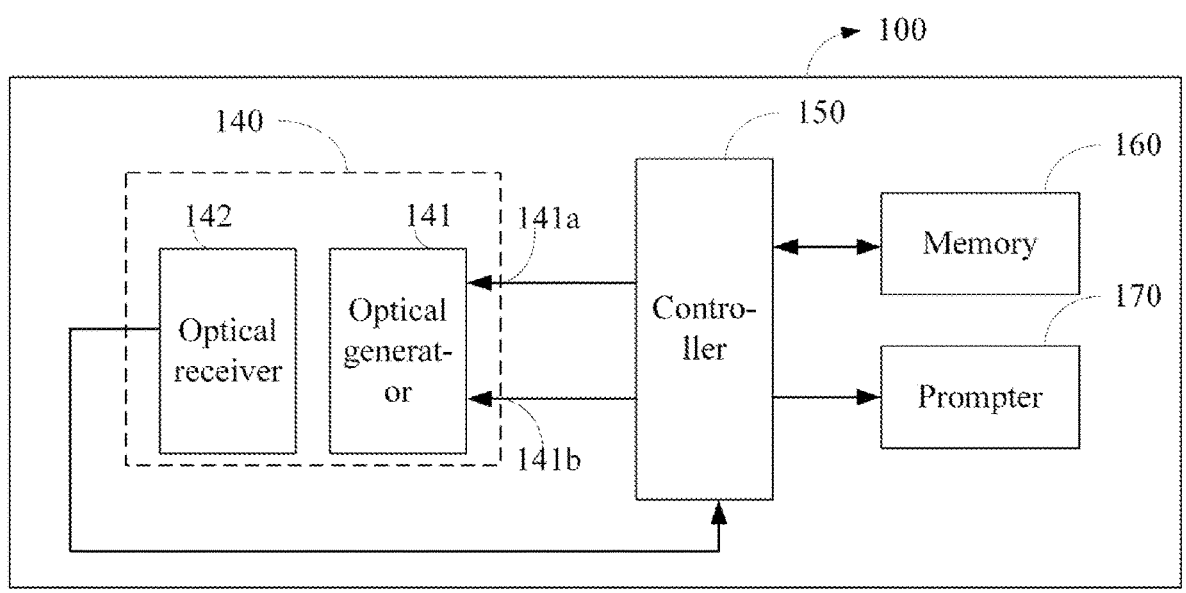
FIG. 5 is a structure block diagram of the vending machine according to the embodiment of the present disclosure.

FIG. 1 is a schematic diagram illustrating the structure of a vending machine according to an embodiment of the present disclosure, FIG. 2 is a schematic diagram illustrating the structure of a storage column of the vending machine viewed from a first angle according to the embodiment of the present disclosure, FIG. 3 is a schematic diagram illustrating the structure of the storage column of the vending machine viewed from a second angle according to the embodiment of the present disclosure, FIG. 4 is an enlarged view of a local structure of the storage column of the vending machine according to the embodiment of the present disclosure, which is an enlarged view of a portion IV in FIG. 3, and FIG. 5 is a structure block diagram of the vending machine according to the embodiment of the present disclosure. The vending machine according to the embodiment of the present disclosure is described below with reference to FIGS. 1 to 5.

Referring to FIGS. 1 and 2, a vending machine 100 is disclosed according to this embodiment, including a cabinet body 110 and a cabinet door 120. The cabinet body 110 is provided with an opening 111, and the cabinet door 120 configured to open or close the opening 111 is flexibly connected to the cabinet body 110. A plurality of storage columns 130 configured to accommodate items are provided inside the cabinet body 110. For ease of description, a structure of the storage column 130 will be described below by taking a target storage column 130 (i.e., any one of the plurality of storage columns) as an example.

Referring to FIGS. 2, 3 and 4, the target storage column 130 includes a base plate 131, a first baffle 132 and a second baffle 133, which all extend in a layout direction of items, and the first baffle 132 and the second baffle 133 are spaced on both sides of the base plate 131 face to face. A plurality of photoelectric sensors 140 (hereinafter referred to as sensors 140 for short) are spaced in the target storage column 130 in the layout direction of items (the direction indicated by arrows a and b in the figure). Each sensor 140 includes an optical generator 141 and an optical receiver 142, which are disposed face to face. Either the optical generator 141 or the optical receiver 142 of the sensor 140 is disposed on one side of the first baffle 132 facing the second baffle 133, and the other is disposed on one side of the second baffle 133 facing the first baffle 132. It should be noted that the face-to-face arrangement of the optical generator 141 and the optical receiver 142 means that a light-emitting surface of the optical generator 141 and a light-receiving surface of the optical receiver 142 are disposed face to face. In this embodiment, the optical generator 141 and the optical receiver 142 disposed face to face are in the same position in the layout direction of items. Of course, in other embodiments, the optical generator 141 and the optical receiver 142 which are disposed face to face may be in different positions in the layout direction of items.

Referring to FIG. 5, the vending machine 100 according to this embodiment further includes a controller 150 electrically connected to the plurality of sensors 140. The optical generator 141 of the sensor 140 is provided with a first input terminal 141a and a second input terminal 141b, which are configured to receive an input value to adjust an output value of the sensor 140. For example, the first input terminal 141a and the second input terminal 141b of the optical generator 141 are both electrically connected to the controller 150, and the controller 150 may adjust the current of the optical generator 141 by adjusting the input value of at least one of the first input terminal 141a and the second input terminal 141b of the optical generator 141, thereby adjusting the luminous intensity of the optical generator 141. The optical receiver 142 of the sensor 140 is provided with an output terminal electrically connected to the controller 150, and the controller 150 may detect the intensity of light received by the optical receiver 142 by acquiring the output value of the output terminal of the optical receiver 142.

In one embodiment, the optical generator 141 of each sensor 140 includes a light-emitting diode (LED) and an LED driver circuit (not shown). The first input terminal 141a and the second input terminal 141b of the optical generator 141 are two input terminals of the LED driver circuit, and the output terminal of the LED driver circuit is electrically connected to the LED. In a case where the input value of either the first input 141a or the second input 141b changes, the output value of the output terminal of the LED driver circuit changes, thereby causing the luminous intensity of the LED, namely the luminous intensity of the optical generator 141 to change. It should be noted that the LED driver circuit may include a circuit consisting of a plurality of electric components. The controller 150 may adjust parameters of a certain component in the LED driver circuit, such as the voltage applied to the LED of the optical generator 141 (i.e., the voltage at the output terminal of the LED driver circuit) or the resistance of resistors connected to the LED in series by adjusting the input value of at least one of the first input terminal 141a and the second input terminal 141b, thereby adjusting the luminous intensity of the LED, i.e., the luminous intensity of the optical generator 141. Of course, the LED driver circuit may further include a driver chip having two input terminals and one output terminal. The controller 150 may adjust the output value of the driver chip by adjusting the input value of at least one of the first input terminal 141a and the second input terminal 141b of the driver chip, thereby adjusting the luminous intensity of the LED, i.e., the luminous intensity of the optical generator 141. To simplify the description below, the first input terminal 141a of the optical generator 141 of the sensor 140 is referred to as the first input terminal 141a of the sensor 140, the second input terminal 141b of the optical generator 141 of the sensor 140 is referred to as the second input terminal 141b of the sensor 140, and the output terminal of the optical receiver 142 of the sensor 140 is referred to as the output terminal of the sensor 140.

Referring to FIG. 5, the vending machine 100 according to this embodiment further includes a memory 160 electrically connected to the controller 150. The memory 160 is configured to store control programs of the vending machine 100 as well as data and variables required for executing the programs. For example, the memory 160 is configured to store a target output value $V_D$, a first offset DV1, a second offset DV2, a plurality of first calibration input values, a plurality of second calibration input values, and a preset reference value. The target output value VD is a target output value preset by a user for each sensor 140 in each storage column 130 after the end of sensor calibration. The first offset DV1 is an allowable offset of the output value of each sensor 140 from the target output value $V_D$ during level 1 calibration on all the sensors 140 in the target storage column 130, and the second offset DV2 is an allowable offset of the output value of each sensor 140 from the target output value $V_D$ during level 2 calibration on each sensor 140 in the target storage column 130. Each first calibration input value is a common input value provided for the second input terminals 141b of all the sensors 140 in the target storage column 130 during level 1 calibration on all the sensors 140 in the target storage column 130, and each second calibration input value is an input value provided for the first input terminal 141a of each sensor 140 in the target storage column 130 during level 2 calibration on each sensor 140 in the target storage column 130. The preset reference value is a reference input value provided for the first input terminals 141a of all the sensors 140 in the target storage column 130 during level 1 calibration on all the sensors 140 in the target storage column 130. For example, the preset reference value is one of the plurality of second calibration input values.

The controller 150 is electrically connected to each sensor 140 in each storage column 130 and the memory 160, and is configured to control the operation of each component of the vending machine 100. For example, the controller 150 is configured to control the optical generator 141 of each sensor 140 to give out light, take an output value of the optical receiver 142 of the sensor 140, and determine, based on the output value, whether there is any item placed between the optical generator 141 and the optical receiver 142 of the sensor 140. The controller 150 is further configured to implement a method for calibrating the sensors 140 of the vending machine 100, including following steps of: taking any one of the plurality of storage columns 130 as a target storage column 130, setting the input values of the first input terminals 141a of all the sensors 140 in the target storage column 130 to a preset reference value, and performing level 1 calibration on all the sensors 140 in the target storage column 130 to determine a first target input value which is common to the second input terminals 141b of all the sensors 140 in the target storage column 130, where the output values of all the sensors 140 in the target storage column 130 meet the requirements for the level 1 calibration in a case where the input values of the first input terminals 141a of all the sensors 140 in the target storage column 130 are set to the preset reference value and the input values of the second input terminals 141b of all the sensors 140 in the target storage column 130 are set to the first target input value which is common to the second input terminals; setting the input values of the second input terminals 141b of all the sensors 140 in the target storage column 130 to the first target input value which is common to the second input terminals, and performing level 2 calibration on each sensor 140 in the target storage column 130 to determine a second target input value corresponding to the first input terminal 141a of the sensor 140, where the output value of each sensor 140 in the target storage column 130 meets the requirements for the level 2 calibration in a case where the input values of the second input terminals 141b of all the sensors 140 in the target storage column 130 are set to the first target input value which is common to the second input terminals and the input value of the first input terminal 141a of each sensor 140 in the target storage column 130 is set to the second target input value corresponding to the sensor 140; and setting the input value of the first input terminal 141a of each sensor 140 in the target storage column 130 to the second target input value corresponding to the sensor 140. For example, when the vending machine 100 includes a plurality of storage columns 130, the controller 150 is configured to calibrate the sensors in each storage column 130 of the vending machine 100 by the above method. For example, the controller 150 is configured to calibrate the sensors in each storage column 130 of the vending machine 100 in sequence using the above method.

In one embodiment, referring to FIG. 5, the vending machine 100 further includes a prompter 170, which is electrically connected to the controller 150 and configured to output a prompt message of calibration failure when the output value of the sensor 140 fails to meet the preset requirements through sensor calibration. For example, the prompter 170 may include at least one of a buzzer, an indicator light, a phonetic device and a display screen.

In the vending machine disclosed in this embodiment, since each sensor 140 is provided with two input terminals, the output value of each sensor 140 may be adjusted when the input value of each input terminal changes. Therefore, in a case where the first input terminal 141a of one sensor 140 has M levels of optional input values and the second input terminal 141b has N levels of optional input values, the sensor 140 will have M*N possible output values. Accordingly, in the vending machine 100 disclosed in this embodiment, the input values of the first input terminals 141a and the input values of the second input terminal 141bs of the sensors 140 are determined through two-level calibration, which may greatly increase the number of adjustable grades of the luminous intensity of the optical generator 141 of the sensor 140, and may further greatly improve the success rate of calibration on the sensor 140. Furthermore, in the vending machine 100 disclosed in this embodiment, the first target input value which is common to the second input terminals 141b of all the sensors 140 in the target storage column 130 is determined through the level 1 calibration, so that the output values of all the sensors 140 in the target storage column 130 are all within the first range. Accordingly, the output values of all the sensors 140 in the plurality of storage columns 130 are all within the first range after performing the level 1 calibration on the sensors 140 of the plurality of storage columns 130, and thus the impact of the discreteness of the sensors 140 on the output values of the sensors 140 due to different widths of the plurality of storage columns 130 may be eliminated. Furthermore, in the method for calibrating sensors in a vending machine disclosed in this embodiment, the second target input value corresponding to the first input terminal 141a of each sensor 140 is determined through the level 2 calibration, so that the output values of all the sensors 140 in the target storage columns 130 are all within the second range, and thus the impact of the discreteness of the sensors 140 on the output values of the sensors 140 due to different characteristics of the sensors 140 may be eliminated. Therefore, with the vending machine 100 disclosed in this embodiment, the output values of a large number of sensors in the vending machine 100 may be made consistent or as consistent as possible, thereby improving the success rate of calibration on sensors in the vending machine 100 and effectively alleviating the problem that a failure tends to occur in the process of calibrating sensors in the vending machine when the vending machine includes a large number of sensors discretely distributed in related technologies.

FIG. 6 is a flowchart of the method for calibrating sensors in a vending machine according to the embodiment of the present disclosure. The method for calibrating sensors in a vending machine is described by taking one storage column (a target storage column) as an example. In a case where the vending machine includes a plurality of storage columns, the sensors in each storage column in the vending machine may be calibrated by this method. For example, with the method, the sensors in the plurality of storage columns of the vending machine may be calibrated in sequence. For example, after all the sensors in one storage column are calibrated with the method, all the sensors in another storage column are calibrated with the method. The method may be implemented by the controller 150 in FIG. 5. As shown in the figure, the method includes following steps S210, S220 and S230.

In the S210, any one of the plurality of storage columns is taken as a target storage column, the input values of the first input terminals of all the sensors in the target storage column are set to a preset reference value, and level 1 calibration is performed on the second input terminals of all the sensors in the target storage column to determine a first target input value which is common to the second input terminals of all the sensors in the target storage column. The output values of all the sensors in the target storage column meet the requirements for the level 1 calibration in a case where the input values of the first input terminals of all the sensors in the target storage column are set to the preset reference value and the input values of the second input terminals of all the sensors in the target storage column are set to the first target input value which is common to the second input terminals.

Taking the vending machine 100 of the embodiment of the present disclosure as an example, the controller 150 takes the preset reference value reading from the memory 160, sets the input values of the first input terminals 141a of all the sensors 140 in the target storage column 130 of the vending machine 100 to the preset reference value, and performs the level 1 calibration on all the sensors 140 in the target storage column 130 to determine the first target input value which is common to the second input terminals 141b of all the sensors 140 in the target storage column 130. The first target input value which is common to the second input terminals 141b of all the sensors 140 in the target storage column 130 meets the requirement that the output values of the sensors 140 in the target storage column 130 meet the requirements for the level 1 calibration in a case where the input values of the first input terminals 141a of all the sensors 140 in the target storage column 130 are set to the preset reference value and the input values of the second input terminals 141b of all the sensors 140 in the target storage column 130 are set to the first target input value which is common to the second input terminals. The output value of the sensor 140 in the target storage column 130 meets the requirements for the level 1 calibration, which means that the output value of each sensor 140 in the target storage column 130 is within a first range from $V_D-DV1$ to $V_D+DV1$, where $V_D$ is a target output value of each sensor 140 preset by the user, DV1 is a first offset which is greater than or equal to zero. For example, in a case where the target output value $V_D$ is 1.2V and the first offset DV1 is 0.1V, the output values of all the sensors in the target storage column 130 are between 1.1V and 1.3V when the output values of the sensors 140 in the target storage column 130 meet the requirements for the level 1 calibration. For example, when the output values of the sensors 140 in the target storage column 130 meet the requirements for the level 1 calibration, the ratio of the number of sensors 140 whose output value is the target output value $V_D$ to the total number of sensors 140 in the target storage column 130 exceeds a first preset ratio. For example, in a case where the target output value $V_D$ is 1.2V, the first preset ratio is 80%, and there are 80 sensors 140 in the target storage column 130, there are more than 64 sensors with the output value of 1.2V in the target storage column 130 when the output values of the sensors 140 in the target storage column 130 meet the requirements for the level 1 calibration.

On this basis, the step in which the level 1 calibration is performed on all the sensors 140 in the target storage column 130 to determine a first target input value which is common to the second input terminals 141b of all the sensors in the target storage column 130 may include following steps.

A first test value for carrying out a first calibration test for the first time is determined, and the first calibration test is carried out at least once until the end of the level 1 calibration. Each first calibration test includes following steps of: setting the input values of the second input terminals 141b of all the sensors 140 in the target storage column 130 to the first test value determined for the current first calibration test, and taking output values of all the sensors 140 in the target storage column 130 to determine whether the output values of all the sensors 140 in the target storage column 130 meet the requirements for the level 1 calibration; if the output values of all the sensors 140 in the target storage column 130 meet the requirements for the level 1 calibration, determining the first test value for the current first calibration test as the first target input value which is common to the second input terminals 141b of all the sensors 140 in the target storage column 130, and ending the level 1 calibration; and if the output values of all the sensors 140 in the target storage column 130 fails to meet the requirements for the level 1 calibration, re-determining a first test value for the next first calibration test and carrying out the next first calibration test. The first test value re-determined for the next first calibration test is different from that for each first calibration test before the next first calibration test.

In one embodiment, the step in which the level 1 calibration is performed on all the sensors 140 in the target storage column 130 to determine a first target input value which is common to the second input terminals 141b of all the sensors in the target storage column 130 includes following steps (a1) to (a4).

In the step (a1), a first calibration input value in the plurality of first calibration input values is determined as the first test value.

In the step (a2), the input values of the second input terminals 141b of all the sensors 140 in the target storage column 130 are set to the first test value determined.

In the step (a3), the output values of all the sensors 140 in the target storage column 130 are taken in sequence to determine whether the output values of all the sensors 140 in the target storage column 130 meet the requirements for the level 1 calibration.

In the step (a4), in a case where the output values of all the sensors 140 in the target storage column 130 can meet the requirements for the level 1 calibration, the first test value, in this case, is determined as the first target input value which is common to the second input terminals 141b of all the sensors 140 in the target storage column 130, and the level 1 calibration ends. In a case where the output values of all the sensors 140 in the target storage column 130 cannot meet the requirements for the level 1 calibration, another first calibration input value in the plurality of first calibration input values is determined as the first test value, and the step (a2) of setting the input values of the second input terminals 141b of all the sensors 140 in the target storage column 130 to the first test value determined is performed again, and this cycle continues until it is determined in the step (a3) that the output values of all the sensors 140 in the target storage column 130 can meet the requirements for the level 1 calibration.

The steps (a2) to (a4) correspond to the steps of the above first calibration test. After the plurality of first calibration input values stored in the memory 160 are taken as the first test values for the first calibration test, it is determined that the level 1 calibration fails without determining the first target input value, and a prompt message is output, i.e., a prompt message of calibration failure is output in a case of a failure to determine the first target input value which is common to the second input terminals 141b of all the sensors 140 in the target storage column 130 by performing the level 1 calibration on the second input terminals 141b of all the sensors 140 in the target storage column 130.

From the above, in a case where the output values of the sensors 140 in the target storage column 130 can meet the requirements for the level 1 calibration, the input values of the first input terminals 141a of all the sensors 140 in the target storage column 130 are the preset reference value, and the input values of the second input terminals 141b of all the sensors 140 in the target storage column 130 are the first target input value which is common to the second input terminals.

In one embodiment, the method for calibrating sensors in a vending machine may also include a step of presetting a plurality of first calibration input values that are sorted in a preset order. The plurality of first calibration input values sorted in a preset order may be called in sequence to be the first test value. In this embodiment, during the level 1 calibration, the controller 150 determines a first calibration input value corresponding to each first calibration test as the first test value for the first calibration test according to the order of the first calibration input values before each first calibration test until the output values of the sensors 140 in the target storage column 130 meet the requirements for the level 1 calibration. For example, the preset order may be an order in which the plurality of first calibration input values increase in sequence or an order in which the plurality of first calibration input values decrease in sequence, e.g., the plurality of first calibration input values stored in the memory 160 are in ascending arithmetic series, and are VCC/256, 2*VCC/256, 3*VCC/256, 255*VCC/256 and VCC, respectively. The controller 150 determines VCC/256, 2*VCC/256, 3*VCC/256 and other first calibration input values from front to back as the first test value.

In one embodiment, a plurality of second calibration input values sorted in ascending order or descending order are further stored in the memory 160, and the preset reference value is a mid-value of the second calibration input values being sorted in ascending or descending order. With such arrangement, it may be ensured that the input values of the first input terminal 141a of each sensor 140 may increase or decrease through adjustment based on the preset reference value when the level 2 calibration is performed on the sensors 140 in the target storage column 130.

In this step, in a case where the input values of the first input terminals 141a of all the sensors 140 in the target storage column 130 are the preset reference value, the level 1 calibration is performed on all the sensors 140 in the target storage column 130 to determine the first target input value which is common to the second input terminals 141b of all the sensors 140 in the storage column 130. In this way, the second input terminals 141b of all the sensors 140 in the target storage column 130 may be set to have the same first target input value, so that the luminous intensity of the optical generators 141 of all the sensors 140 in the target storage column 130 is adapted to the width of the target storage column 130, i.e., in a case where the width of the target storage column 130 is set to a current value, the first input terminals 141a of all the sensors 140 in the target storage column 130 are set to have the preset reference value, and the second input terminals 141b of all the sensors 140 in the target storage column are set to have the corresponding first target input value which is common to the second input terminals, the output values of all the sensors 140 in the target storage column 130 are equal to or fairly close to the target output value $V_D$, thus eliminating the impact of the discreteness of the sensors 140 in the vending machine 100 on the output values of the sensors 140 due to different widths of the plurality of storage columns 130 in the vending machine 100, and improving the success rate of calibration on the sensors in the vending machine 100.

In the S220, the input values of the second input terminals of all the sensors in the target storage column are set to the first target input value which is common to the second input terminals, and the level 2 calibration is performed on the first input terminal of each sensor in the target storage column to determine a second target input value corresponding to the first input terminal of the sensor. The output values of all the sensors in the target storage column meet the requirements for the level 2 calibration in a case where the input values of the second input terminals of all the sensors in the target storage column are set to the first target input value which is common to the second input terminals and the input value of the first input terminal of each sensor in the target storage column is set to the second target input value corresponding to the sensor.

Taking the vending machine 100 according to this embodiment of the present disclosure as an example, after the first target input value which is common to the second input terminals 141b of all the sensors 140 in the target storage column 130 is determined in the S210, the controller 150 sets the input values of the second input terminals 141b of all the sensors 140 in the target storage column 130 to the first target input value which is common to the second input terminals, and then performs the level 2 calibration on each sensor 140 in the target storage column 130 to determine a second target input value corresponding to the first input terminal 141a of the sensor 140. The second target input value corresponding to the first input terminal 141a of each sensor 140 meets the requirement that the output value of the sensor 140 meets the requirements for the level 2 calibration if the input value of the second input terminal 141b of the sensor 140 is set to the first target input value which is common to the second input terminals 141b of all the sensors 140 in the target storage column 130 where the sensor 140 is located, and the input value of the first input terminal 141a of the sensor 140 is set to the second target input value corresponding to the sensor 140. The output value of a sensor 140 meets the requirements for the level 2 calibration, which means that the output value of the sensor 140 is within a second range from $V_D$–DV2 to $V_D$+DV2, where $V_D$ is a target output value of each sensor 140 preset by the user, DV2 is a second offset that is less than the first offset DV1 and greater than or equal to zero. For example, if the target output value $V_D$ is 1.2V and the second offset DV2 is 0.05V, the output value of the sensor 140 will be between 1.15V and 1.25V when meeting the requirements for the level 2 calibration. For another example, if the target output value $V_D$ is 1.2V and the second offset DV2 is zero, the output value of the sensor 140 is 1.2V when meeting the requirements for the level 2 calibration.

In one embodiment, the step in which level 2 calibration is performed on the first input terminal 141a of each sensor 140 in the target storage column 130 to determine the second target input value corresponding to the first input terminal 141a of the sensor 140 includes following steps.

In a case where the input value of the first input terminal 141a of the sensor 140 is set to the preset reference value and the input value of the second input terminal 141b is set to the first target input value which is common to the second input terminals 141b of all the sensors 140 in the target storage column 130 where the sensor is located, the output value of the sensor 140 is taken as a third output value to determine whether the third output value is equal to the target output value. If the third output value is equal to the target output value, the preset reference value is determined as the second target input value corresponding to the first input terminal 141a of the sensor 140, and if the third output value is not equal to the target output value, an eligible second calibration input value in the plurality of second calibration input values sorted in a preset order is determined as a second test value for carrying out a second calibration test for the first time, and the second calibration test is carried out on the sensor 140 at least once until the end of the level 2 calibration on the sensor 140. Each second calibration test includes following steps of: setting the input value of the first input terminal 141a of the sensor 140 as the second test value determined for the second calibration test, taking the output value of the sensor 140 as a fourth output value, determining whether the fourth output value is equal to the target output value; if the fourth output value is equal to the target output value, determining the second test value for this second calibration test as the second target input value corresponding to the first input terminal 141a of the sensor 140, and ending the level 2 calibration on the sensor, and if the fourth output value is equal to the target output value, determining whether the magnitude relation between the fourth output value and the target output value changes with respect to that between the third output value and the target output value, if the magnitude relation between the fourth output value and the target output value does not change with respect to that between the third output value and the target output value, determining a next eligible second calibration input value in the plurality of second calibration input values sorted in the preset order as the second test value for a next second calibration test, and carrying out the next second calibration test on the sensor 140, and if the magnitude relation between the fourth output value and the target output value changes with respect to that between the third output value and the target output value, determining whether both the current fourth output value and a previous output value are within the second range; where the previous output value is the previous fourth output value or the third output value; if both the current fourth output value and the previous output value are within the second range, determining the input value corresponding to either the current fourth output value or the previous output value that is closer to the target output value as the input value of the first input terminal of the sensor, and ending the level 2 calibration on the sensor 140; if only one of the current fourth output value and the previous output value is within the second range, determining the input value of the first input terminal of the sensor 140 corresponding to either the current fourth output value or the previous output value that is within the second range as the second target input value corresponding to the first input terminal of the sensor 140, and ending the level 2 calibration on the sensor 140; and if neither the current fourth output value nor the previous output value is within the second range, ending the level 2 calibration on the sensor 140.

If the magnitude relation between the fourth output value and the target output value changes with respect to that between the third output value and the target output value when carrying out the second calibration test for the first time, whether or not both the fourth output value and the third output value are within the second range is determined. If both the fourth output value and the third output value are within the second range, the input value of the first input terminal of the sensor 140 corresponding to either the fourth output value or the third output value that is closer to the target output value is determined as the second target input value corresponding to the first input terminal of the sensor 140. If only one of the fourth output value and the third output value is within the second range, the input value of the first input terminal of the sensor 140 corresponding to either the fourth output value or the third output value that is within the second range as the second target input value corresponding to the first input terminal of the sensor 140, and the level 2 calibration on the sensor 140 ends. If neither the fourth output value nor the third output value is within the second range, the level 2 calibration on the sensor 140 ends.

If the magnitude relation between the fourth output value and the target output value does not change with respect to that between the third output value and the target output value when carrying out the second calibration test for the first time, and other second calibration tests are performed (such as for the second and third times), whether or not the magnitude relation between the fourth output value and the target output value changes with respect to that between the third output value and the target output value is determined during each second calibration test after the first-time second calibration test. If the magnitude relation between the fourth output value and the target output value changes with respect to that between the third output value and the target output value during a certain second calibration test, whether or not both the current fourth output value and the previous fourth output value are within the second range is determined, if both the current fourth output value and the previous fourth output value are within the second range, the second test value corresponding to either the current fourth output value or the previous fourth output value that is closer to the target output value is determined as the second target input value corresponding to the first input terminal of the sensor 140, and the level 2 calibration on the sensor 140 ends. If only one of the current fourth output value and the previous fourth output value is within the second range, the second test value corresponding to either the current fourth output value or the previous fourth output value that is within the second range is determined as the second target input value corresponding to the first input terminal of the sensor 140, and the level 2 calibration on the sensor 140 ends. If neither the current fourth output value nor the previous fourth output value is within the second range, the level 2 calibration on the sensor 140 ends.

In one example, the step of determining whether the magnitude relation between the fourth output value and the target output value changes with respect to that between the third output value and the target output value includes following steps of: determining that the magnitude relation between the fourth output value and the target output value does not change with respect to that between the third output value and the target output value if both the fourth output value and the third output value are greater than the target output value or both the fourth output value and the third output value are less than the target output value; and determining that the magnitude relation between the fourth output value and the target output value changes with respect to that between the third output value and the target output value if the fourth output value is greater than the target output value and the third output value is less than the target output value, or the fourth output value is less than the target output value and the third output value is greater than the target output value.

In one embodiment, a prompt message of calibration failure is output in a case of a failure to determine the second target input value corresponding to the first input terminal 141a of a sensor 140 by performing the level 2 calibration on the first input terminal 141a of the sensor 140 in the target storage column 130. It should be noted that when carrying out the second calibration test on a sensor 140, the input value of the second input terminal 141b of the sensor 140 is always set to the first target input value which is common to the second input terminals of all the sensors 140 in the target storage column 130 where the sensor 140 is located.

In one embodiment, the step in which the level 2 calibration is performed on each sensor 140 in the target storage column 130 to determine the second target input value corresponding to the first input terminal 141a of each sensor 140 includes following steps (b1) to (b2).

In the step (b1), in a case where the input value of the first input terminal 141a of one sensor 140 is set to the preset reference value and the input value of the second input terminal 141b thereof is set to the first target input value which is common to the second input terminals 141b of all the sensors 140 in the target storage column 130 where the sensor 140 is located, the output value of the sensor 140 is taken as the third output value to determine whether the third output value is equal to the target output value $V_D$. In a case where the third output value is equal to the target output value $V_D$, the preset reference value is determined as the second target input value corresponding to the second input terminal 141b of the sensor 140, and the level 2 calibration on the sensor 140 ends. In a case where the third output value is not equal to the target output value $V_D$, the step (b2) is performed.

In the step (b2), the input values of the first input terminal 141a of the sensor 140 is determined to increase or decrease through adjustment based on the magnitude relation between the third output value and the target output value $V_D$. For example, the plurality of second calibration input values are sorted in ascending order or descending order, and the preset reference value is a mid-value of the second calibration input values sorted in ascending or descending order. The input value of the first input terminal 141a of the sensor 140 is determined to increase through adjustment in a case where the third output value is less than the target output value $V_D$, and is determined to decrease through adjustment in a case where the third output value is greater than the target output value $V_D$. Of course, in other embodiments of the present disclosure, the input value of the first input terminal 141a of the sensor 140 may be determined to decrease through adjustment in a case where the third output value is less than the target output value $V_D$, and may be determined to increase through adjustment in a case where the third output value is greater than the target output value $V_D$.

The second calibration test is performed at least once until the end of the level 2 calibration, and each second calibration test includes following steps (b3) to (b6).

In the step (b3), an eligible second calibration input value in the plurality of second calibration input values sorted in a preset order is determined as the second test value for the current second calibration test according to an increase or a decrease of the input values of the first input terminal 141*a* of the sensor 140. For example, a plurality of second calibration input values are stored in the memory 160, and the preset reference value is a mid-value of the second calibration input values sorted in ascending or descending order. In a case where the input values of the first input terminal 141*a* of the sensor 140 increase through adjustment, the eligible second calibration input value is a second calibration input value greater than the preset reference value. Before each second calibration test, the controller 150 determines a second correction input value in the plurality of second calibration input values greater than the preset reference value as the second test value for the current second correction test based on the ascending order of the second calibration input values. In a case where the input values of the first input terminal 141*a* of the sensor 140 are adjusted in descending order, the eligible second calibration input value is a second calibration input value less than the preset reference value. Before each second calibration test, the controller 150 determines a second correction input value in the plurality of second calibration input values less than the preset reference value as the second test value for the current second correction test based on the descending order of the second calibration input values. For example, the plurality of second calibration input values are in ascending arithmetic series, and are VCC/256, 2*VCC/256, 3*VCC/256, . . . , 255*VCC/256 and VCC, respectively, and the preset reference value is 128*VCC/256. In a case where the input values of the first input terminal 141*a* of the sensor 140 are adjusted in ascending order, the controller 150 determines 129*VCC/256, 130*VCC/256, 131*VCC/256 and other second calibration input values as the second test value in sequence when performing the step (b3) multiple times, respectively.

In one embodiment, in a case where the third output value is less than the target output value, before carrying out each second calibration test, a second calibration input value in the plurality of eligible second calibration input values is determined as the second test value for the second calibration test based on the ascending order of the second calibration input values. In a case where the third output value is greater than the target output value, before carrying out each second calibration test, an second calibration input value in the plurality of eligible second calibration input values is determined as the second test value for the second calibration test based on the descending order of the second calibration input values.

In the step (b4), the input value of the first input terminal 141*a* of the sensor 140 is set to the second test value determined for the current second calibration test.

In the step (b5), the output value of the sensor 140 is taken as the fourth output value to determine whether the fourth output value is equal to the target output value $V_D$. In a case where the fourth output value is equal to the target output value $V_D$, the second test value, in this case, is determined as the second target input value corresponding to the first input terminal 141*a* of the sensor 140, and the level 2 calibration on the sensor 140 ends. In a case where the fourth output value is not equal to the target output value $V_D$, the step (b6) is performed.

In the step (b6), it is determined whether or not the magnitude relation between the fourth output value and the target output value $V_D$ changes with respect to that between the third output value and the target output value $V_D$. If the magnitude relation between the fourth output value and the target output value $V_D$ does not change with respect to that between the third output value and the target output value $V_D$, the step (b3) in which an eligible second calibration input value in the plurality of second calibration input values sorted in a preset order is determined as the second test value for the next second calibration test according to an adjustment direction of the input value of the first input terminal 141*a* of the sensor 140 is performed, and this cycle continues until the end of the level 2 calibration on the sensor 140. If the magnitude relation between the fourth output value and the target output value $V_D$ changes with respect to that between the third output value and the target output value $V_D$, whether or not both the current fourth output value and the previous output value are within the second range is determined. In a case where both the current fourth output value and the previous output value are within the second range, the input value of the first input terminal of the sensor 140 corresponding to either the current fourth output value or the previous output value that is closer to the target output value $V_D$ is determined as the second target input value corresponding to the first input terminal 141*a* of the sensor 140, and the level 2 calibration on the sensor 140 ends. In a case where only one of the current fourth output value and the previous output value is within the second range, the input value of the first input terminal of the sensor 140 corresponding to either the current fourth output value or the previous output value that is within the second range is determined as the second target input value corresponding to the first input terminal 141*a* of the sensor 140, and the level 2 calibration on the sensor 140 ends. In a case where neither the current fourth output value nor the previous output value is within the first range, the level 2 calibration on the sensor 140 ends, and the controller 150 controls the prompter 170 of the vending machine 100 to send a prompt message of failure in calibration on the sensor 140.

In the method for performing the level 2 calibration on one sensor 140 described above, since the controller 150 determines the plurality of eligible second calibration input values sorted in the preset order as the second test value in sequence according to the adjustment direction of the input value of the first input terminal 141*a* of the sensor 140, it indicates that the output value of the sensor 140 cannot reach the target output value $V_D$ by adjusting the input value of the first input terminal 141*a* of the sensor 140 in a case where the magnitude relation between the current fourth output value and the target output value $V_D$ changes with respect to that between the third output value and the target output value $V_D$. In this case, the controller 150 keeps the output value of the sensor 140 within the second range by determining an appropriate second target input value and makes the output value of the sensor 140 as close as possible to the target output value $V_D$. The second offset used to determine the second range is often small, for example, less than 0.1V, it is possible in this case to achieve a higher success rate of calibration on the sensor 140 without a large impact on the detection accuracy of the sensor 140, thus improving the flexibility in the use of the vending machine 100. In a case of a failure to keep the output value of the sensor 140 within the second range by determining an appropriate second target input value, the controller 150 controls the prompter 170 to output a prompt message to remind the user, thereby improving the user's convenience during use.

From the above, in a case where the output value of one sensor 140 can meet the requirements for the level 2 calibration, the input value of the first input terminal 141a of the sensor 140 is the second target input value corresponding to the sensor 140, and the input value of the second input terminal 141b of the sensor 140 is the first target input value which is common to the second input terminals 141b of all the sensors 140 in the target storage column 130 where the sensor 140 is located.

In one embodiment, the controller 150 performs the level 2 calibration on each sensor 140 in the target storage column 130 until the second target input value corresponding to the first input terminal 141a of each sensor 140 in the target storage column 130 is determined.

In this step, the input value of the first input terminal 141a of each sensor 140 in the target storage column 130 is adjusted based on the preset reference value, and the second target input value corresponding to the first input terminal 141a of each sensor 140 is determined. In this way, the first input terminals 141a of the plurality of sensors 140 in the target storage column 130 of the vending machine 100 may correspond to different second target input values, so that the output value of each sensor 140 in the target storage column 130 is equal to or closer to the target output value $V_D$, thereby eliminating the impact of the discreteness of the sensors 140 in the vending machine 100 on the output values of the sensors 140 due to different characteristics of the plurality of sensors 140 in each storage column 130 of the vending machine 100.

In addition, in other embodiments of the present disclosure, the step in which the level 2 calibration is performed on the first input terminal 141a of each sensor 140 in the target storage column 130 to determine the second target input value corresponding to the first input terminal 141a of the sensor 140 may also be implemented in the following way.

In a case where the input value of the first input terminal 141a of one sensor 140 is set to the preset reference value and the input value of the second input terminal 141b thereof is set to the first target input value which is common to the second input terminals 141b of all the sensors 140 in the target storage column 130 where the sensor 140 is located, the output value of the sensor 140 is taken as a first output value to determine whether the first output value meets the requirements for the level 2 calibration. If the first output value meets the requirements for the level 2 calibration, the preset reference value is determined as the second target input value corresponding to the first input terminal 141a of the sensor 140. If the first output value fails to meet the requirements for the level 2 calibration, a second test value for carrying out the second calibration test for the first time is determined, and the second calibration test is carried out on the sensor 140 at least once until the end of the level 2 calibration on the sensor 140. Each second calibration test includes following steps of: setting the input value of the first input terminal 141a of the sensor 140 to the second test value determined for the current second calibration test, and taking the output value of the sensor 140 as a second output value to determine whether the second output value meets the requirements for the level 2 calibration; if the second output value meets the requirements for the level 2 calibration, determining the second test value for the current second calibration test as the second target input value corresponding to the first input terminal 141a of the sensor 140, and ending the level 2 calibration on the sensor 140, and if the second output value fails to meet the requirements for the level 2 calibration, re-determining a second test value for the next second calibration test and carrying out the next second calibration test on the sensor 140. The second test value re-determined for the next second calibration test is different from the second test value for each second calibration test before the next first calibration test.

It should be noted that when carrying out the second calibration test on a sensor 140, the input value of the second input terminal 141b of the sensor 140 is always set to the first target input value which is common to the second input terminals 141b of all the sensors 140 in the target storage column 130 where the sensor 140 is located.

In this level 2 calibration method, the second test value determined each time may also be selected from the plurality of second calibration input values stored in advance, the plurality of second calibration input values may be sorted either in ascending or descending order, which will not be repeated herein. The output value of the sensor 140 meets the requirement for level 2 calibration, which may also mean that the output value of the sensor 140 is within the second range from $V_D$-DV2 to $V_D$+DV2, as in the above embodiments. Compared with the level 2 calibration method described above, this level 2 calibration method in this embodiment may end the level 2 calibration once the output value of the sensor 140 meets the requirements for the level 2 calibration when the second test value is taken as the second target input value. In this case, the second test value as the second target input value is not required to make the output value of the sensor 140 as close as possible to the target output value, so this level 2 calibration method may be applied to some cases where the calibration accuracy of the sensor is not required.

In the S230, the input value of the first input terminal of each sensor in the target storage column is set to the second target input value corresponding to the sensor.

Taking the vending machine 100 according to the embodiment of the present disclosure as an example, after the second target input value corresponding to the first input terminal 141a of each sensor 140 in the target storage column 130 is determined, the controller 150 sets the input value of the first input terminal 141a of each sensor 140 in the target storage column 130 to the second target input value corresponding to the sensor 140. Since the input value of the second input terminal 141b of each sensor 140 in the target storage column 130 is already set to the first target input value which is common to all the sensors 140 in the target storage column 130 in the S220, the output value of each sensor 140 in the target storage column 130 may meet the requirements for the level 2 calibration, i.e., the output value of each sensor 140 is equal to or as close as possible to the target output value $V_D$.

It should be noted that the controller 150 calibrates the sensors 140 in each storage column 130 of the vending machine 100 in sequence using the method for calibrating sensors disclosed in this embodiment until the second target input value corresponding to the first input terminal 141a of each sensor 140 in each storage column 130 and the first target input value which is common to the second input terminals 141b of all the sensors 140 in each storage column 130 are determined, and sets the input value of the first input terminal 141a of each sensor 140 in each storage column 130 to the second target input value corresponding to the sensor 140, and the input values of the second input terminals 141b of all the sensors 140 in each storage column 130 to the first target input value which is common to all the sensors 140 in this storage column 130.

In the method for calibrating sensors in a vending machine disclosed in this embodiment, the input values of the first input terminals and the input values of the second input terminals of the sensors are determined through two-level calibration, respectively, which may greatly increase the number of adjustable grades of the luminous intensity of the optical generator of the sensor, and may further greatly improve the success rate of calibration on the sensors. Furthermore, in the method for calibrating sensors in a vending machine disclosed in this embodiment, the first target input value which is common to the second input terminals of all the sensors in the target storage column is determined through the level 1 calibration, so that the output values of all the sensors in the target storage column are within the first range. Accordingly, the output values of all the sensors in the plurality of storage columns are all within the first range after performing calibration on the plurality of storage columns, and thus the impact of the discreteness of the sensors on the output values of the sensors due to different widths of the plurality of storage columns may be eliminated. Furthermore, in the method for calibrating sensors in a vending machine disclosed in this embodiment, the second target input value corresponding to the first input terminal of each sensor is determined through the level 2 calibration, so that the output values of all the sensors in the target storage columns are all within the second range, and thus the impact of the discreteness of the sensors on the output values of the sensors due to different characteristics of the sensors may be eliminated. Therefore, with the method for calibrating sensors in a vending machine disclosed in this embodiment, the output values of a large number of sensors in the vending machine may be made consistent or as consistent as possible, thereby improving the success rate of calibration on sensors in the vending machine, and effectively alleviating the problem that a failure tends to occur in the process of calibrating sensors in the vending machine when the vending machine includes a large number of sensors discretely distributed in related technologies.

What is claimed is:

1. A method for calibrating sensors in a vending machine, wherein the vending machine comprises at least one storage column in which a plurality of sensors are provided, each sensor comprises a first input terminal and a second input terminal which are both configured to receive an input value to adjust an output value of the sensor; and the method comprises:

taking any one of the plurality of storage columns as a target storage column, setting the input values of the first input terminals of all sensors in the target storage column to a preset reference value, and performing level 1 calibration on the second input terminals of all the sensors in the target storage column to determine a first target input value which is common to the second input terminals of all the sensors in the target storage column, wherein the output values of all the sensors in the target storage column meet the requirements for the level 1 calibration in a case where the input values of the first input terminals of all the sensors in the target storage column are set to the preset reference value and the input values of the second input terminals of all the sensors in the target storage column are set to the first target input value which is common to the second input terminals;

setting the input values of the second input terminals of all the sensors in the target storage column to the first target input value which is common to the second input terminals, and performing level 2 calibration on the first input terminal of each sensor in the target storage column to determine a second target input value which corresponds to the first input terminal of the sensor, wherein the output values of all the sensors in the target storage column meet the requirements for the level 2 calibration in a case where the input values of the second input terminals of all the sensors in the target storage column are set to the first target input value which is common to the second input terminals and the input value of the first input terminal of each sensor in the target storage column is set to the second target input value corresponding to the sensor; and setting the input value of the first input terminal of each sensor in the target storage column to the second target input value corresponding to the sensor.

2. The method of claim 1, wherein the step of performing level 1 calibration on the second input terminals of all the sensors in the target storage column to determine the first target input value which is common to the second input terminals of all the sensors in the target storage column comprises:

determining a first test value for carrying out a first calibration test for the first time, and carrying out the first calibration test at least once until the end of the level 1 calibration, wherein each first calibration test comprises:

setting the input values of the second input terminals of all the sensors in the target storage column to the first test value determined for the current first calibration test, and taking output values of all the sensors in the target storage column to determine whether the output values of all the sensors in the target storage column meet the requirements for the level 1 calibration; in a case where the output values of all the sensors in the target storage column meet the requirements for the level 1 calibration, determining the first test value for the current first calibration test as the first target input value which is common to the second input terminals of all the sensors in the target storage column, and ending the level 1 calibration; and in a case where the output values of all the sensors in the target storage column fail to meet the requirements for the level 1 calibration, re-determining a first test value for the next first calibration test and carrying out the next first calibration test, wherein the first test value re-determined for the next first calibration test is different from that for each first calibration test before the next first calibration test.

3. The method of claim 2, further comprising: presetting a plurality of first calibration input values sorted in ascending order or descending order; and wherein the first test value for each first calibration test is determined by: before carrying out each first calibration test, determining a first calibration input value in the plurality of first correction input values as the first test value for the first calibration test based on the order of the first calibration input values.

4. The method of claim 1, wherein the step of performing level 2 calibration on the first input terminal of each sensor in the target storage column to determine a second target input value corresponding to the first input terminal of the sensor comprises:

taking an output value of the sensor as a first output value to determine whether the first output value meets the requirements for the level 2 calibration in a case where the input value of the first input terminal of the sensor is set to the preset reference value and the input value of the second input terminal is set to the first target input value which is common to the second input terminals of all the sensors in the target storage column where the sensor is located;

in a case where the first output value meets the requirements for the level 2 calibration, determining the preset reference value as the second target input value corresponding to the first input terminal of the sensor; and in a case where the first output value fails to meet the requirements for the level 2 calibration, determining a second test value for carrying out a second calibration test for the first time, and carrying out the second calibration test on the sensor at least once until the end of the level 2 calibration on the sensor, wherein each second calibration test comprises following steps of: setting the input value of the first input terminal of the sensor to the second test value determined for the current second calibration test, and taking the output value of the sensor as a second output value to determine whether the second output value meets the requirements for the level 2 calibration; in a case where the second output value meets the requirements for the level 2 calibration, determining the second test value for the current second calibration test as the second target input value corresponding to the first input terminal of the sensor, and ending the level 2 calibration, and in a case where the second output value fails to meet the requirements for the level 2 calibration, re-determining a second test value for the next second calibration test and carrying out the next second calibration test on the sensor, wherein the second test value re-determined for the next second calibration test is different from the second test value for each second calibration test before the next first calibration test.

5. The method of claim 1, wherein that the output values of all the sensors in the target storage column meet the requirements for the level 1 calibration comprises the following characteristics:

the output values of all the sensors in the target storage column are all within a first range from $V_D$–DV1 to $V_D$+DV1, wherein $V_D$ is a target output value of each sensor preset by a user, and DV1 is a first offset that is greater than or equal to zero; and the output value of each sensor in the target storage column meets the requirements for the level 2 calibration; and the output value of each sensor in the target storage column is within a second range from $V_D$–DV2 to $V_D$+DV2, wherein DV2 is a second offset that is less than the first offset and greater than or equal to zero.

6. The method of claim 5, wherein the step of performing level 2 calibration on the first input terminal of each sensor in the target storage column to determine a second target input value corresponding to the first input terminal of the sensor comprises:

taking the output value of the sensor as a third output value to determine whether the third output value is equal to the target output value in a case where the input value of the first input terminal of the sensor is set to the preset reference value and the input value of the second input terminal is set to the first target input value which is common to the second input terminals of all the sensors in the target storage column where the sensor is located; in a case where the third output value is equal to the target output value, determining the preset reference value as the second target input value corresponding to the first input terminal of the sensor; and in a case where the third output value is not equal to the target output value, determining an eligible second calibration input value in a plurality of second calibration input values sorted in a preset order as a second test value, and carrying out a second calibration test on the sensor at least once until the end of the level 2 calibration on the sensor, wherein each second calibration test comprises:

setting the input value of the first input terminal of the sensor to the second test value determined for the current second calibration test, and taking the output value of the sensor as a fourth output value to determine whether the fourth output value is equal to the target output value, in a case where the fourth output value is equal to the target output value, determining the second test value for the current second calibration test as the second target input value corresponding to the first input terminal of the sensor, and ending the level 2 calibration on the sensor, and in a case where the fourth output value is not equal to the target output value, determining whether or not the magnitude relation between the fourth output value and the target output value changes with respect to that between the third output value and the target output value; in a case where the magnitude relation between the fourth output value and the target output value does not change with respect to that between the third output value and the target output value, determining the next eligible second calibration input value in the plurality of second calibration input values sorted in the preset order as the second test value for the next second calibration test, and carrying out the next second calibration test on the sensor, and in a case where the magnitude relation between the fourth output value and the target output value changes with respect to that between the third output value and the target output value, determining whether both the current fourth output value and a previous output value are within the second range; in a case where both the current fourth output value and the previous output value are within the second range, determining the input value of the first input terminal of the sensor corresponding to either the current fourth output value or the previous output value that is closer to the target output value, and ending the level 2 calibration on the sensor; in a case where only one of the current fourth output value and the previous output value is within the second range, determining the input value of the first input terminal of the sensor corresponding to either the current fourth output value or the previous output value that is within the second range as the second target input value corresponding to the first input terminal of the sensor, and ending the level 2 calibration on the sensor; and in a case where neither the current fourth output value nor the previous output value is within the second range, ending the level 2 calibration on the sensor; wherein the previous output value is the previous fourth output value or the third output value.

7. The method of claim 6, wherein the plurality of second calibration input values are sorted in ascending order or descending order, and the preset reference value is a mid-value of the plurality of second calibration input values; and the step of determining an eligible second calibration input value in the plurality of second calibration input values sorted in a preset order as the second test value comprises: determining a second calibration input value greater than the preset reference value as the eligible second calibration input value in a case where the third output value is less than the target output value, and determining a second calibration input value less than the preset reference value as the eligible second calibration input value in a case where the third output value is greater than the target output value.

8. The method of claim 7, wherein in a case where the third output value is less than the target output value, before carrying out each second calibration test, a second calibration input value in the plurality of eligible second calibration input values is determined as the second test value for the second calibration test based on the ascending order of the second calibration input values; and in a case where the third output value is greater than the target output value, before carrying out each second calibration test, an second calibration input value in the plurality of eligible second calibration input values is determined as the second test value for the second calibration test based on the descending order of the second calibration input values.

9. The method of claim 1, further comprising:
outputting a prompt message of calibration failure in a case of a failure to determine the first target input value which is common to the second input terminals of all the sensors in the target storage column by performing the level 1 calibration on the second input terminals of all the sensors in the target storage column or in a case of a failure to determine the second target input value corresponding to the first input terminal of one sensor in the target storage column by performing the level 2 calibration on the first input terminal of the sensor in the target storage column.

10. A vending machine, comprising a controller and at least one storage column, wherein a plurality of sensors all electrically connected to the controller are provided in each storage column, each sensor comprises a first input terminal and a second input terminal which are both configured to receive an input value to adjust an output value of the sensor, and the controller is configured to:
take any one of the plurality of storage columns as a target storage column, set the input values of the first input terminals of all sensors in the target storage column to a preset reference value, and perform level 1 calibration on the second input terminals of all the sensors in the target storage column to determine a first target input value which is common to the second input terminals of all the sensors in the target storage column, wherein the output values of all the sensors in the target storage column meet the requirements for the level 1 calibration in a case where the input values of the first input terminals of all the sensors in the target storage column are set to the preset reference value and the input values of the second input terminals of all the sensors in the target storage column are set to the first target input value which is common to the second input terminals; set the input values of the second input terminals of all the sensors in the target storage column to the first target input value which is common to the second input terminals, and perform level 2 calibration on the first input terminal of each sensor in the target storage column to determine a second target input value corresponding to the first input terminal of the sensor, wherein the output values of all the sensors in the target storage column meet the requirements for the level 2 calibration in a case where the input values of the second input terminals of all the sensors in the target storage column are set to the first target input value which is common to the second input terminals and the input value of the first input terminal of each sensor in the target storage column is set to the second target input value corresponding to the sensor; and set the input value of the first input terminal of each sensor in the target storage column to the second target input value corresponding to the sensor.

* * * * *